Patented Oct. 21, 1952

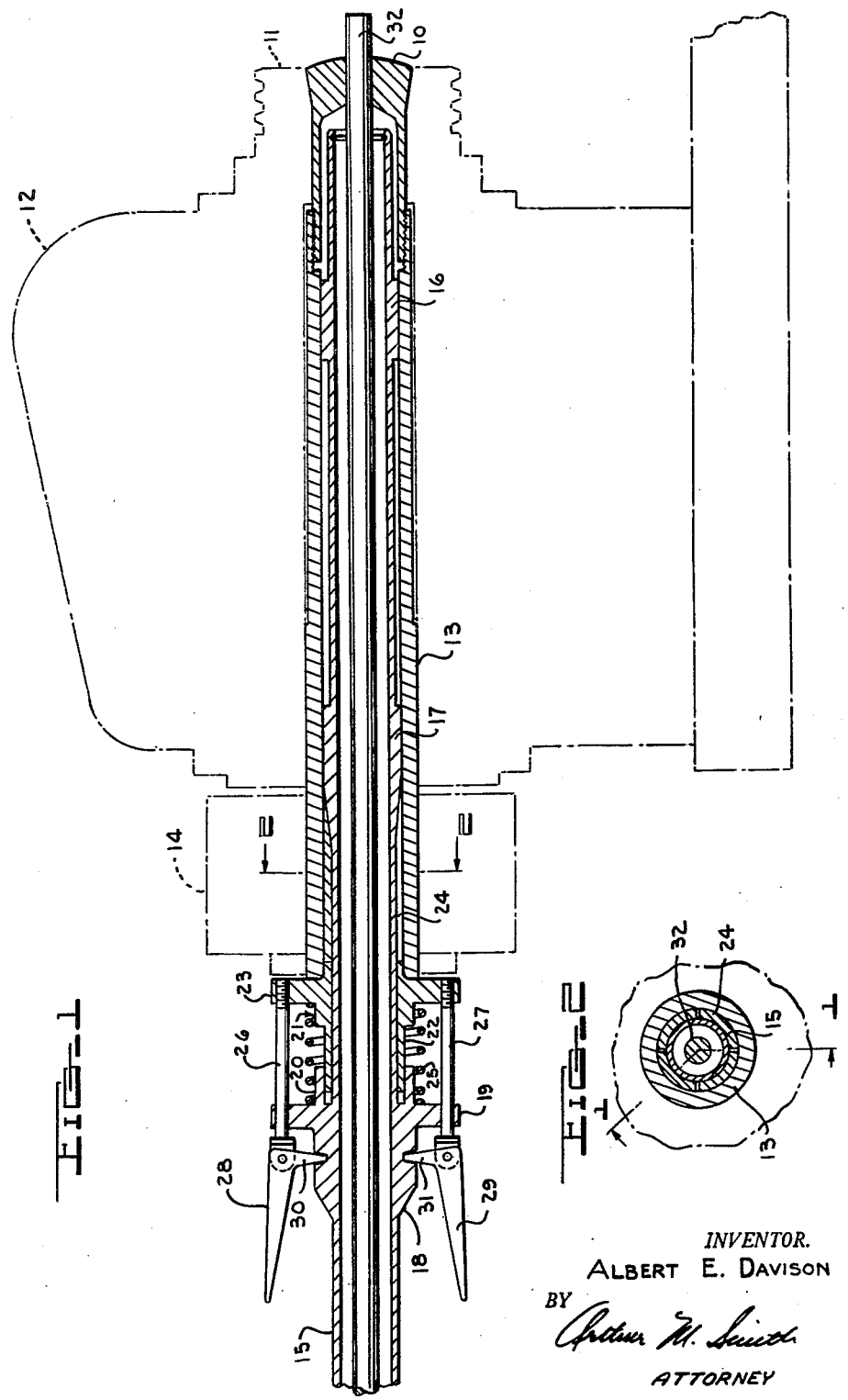

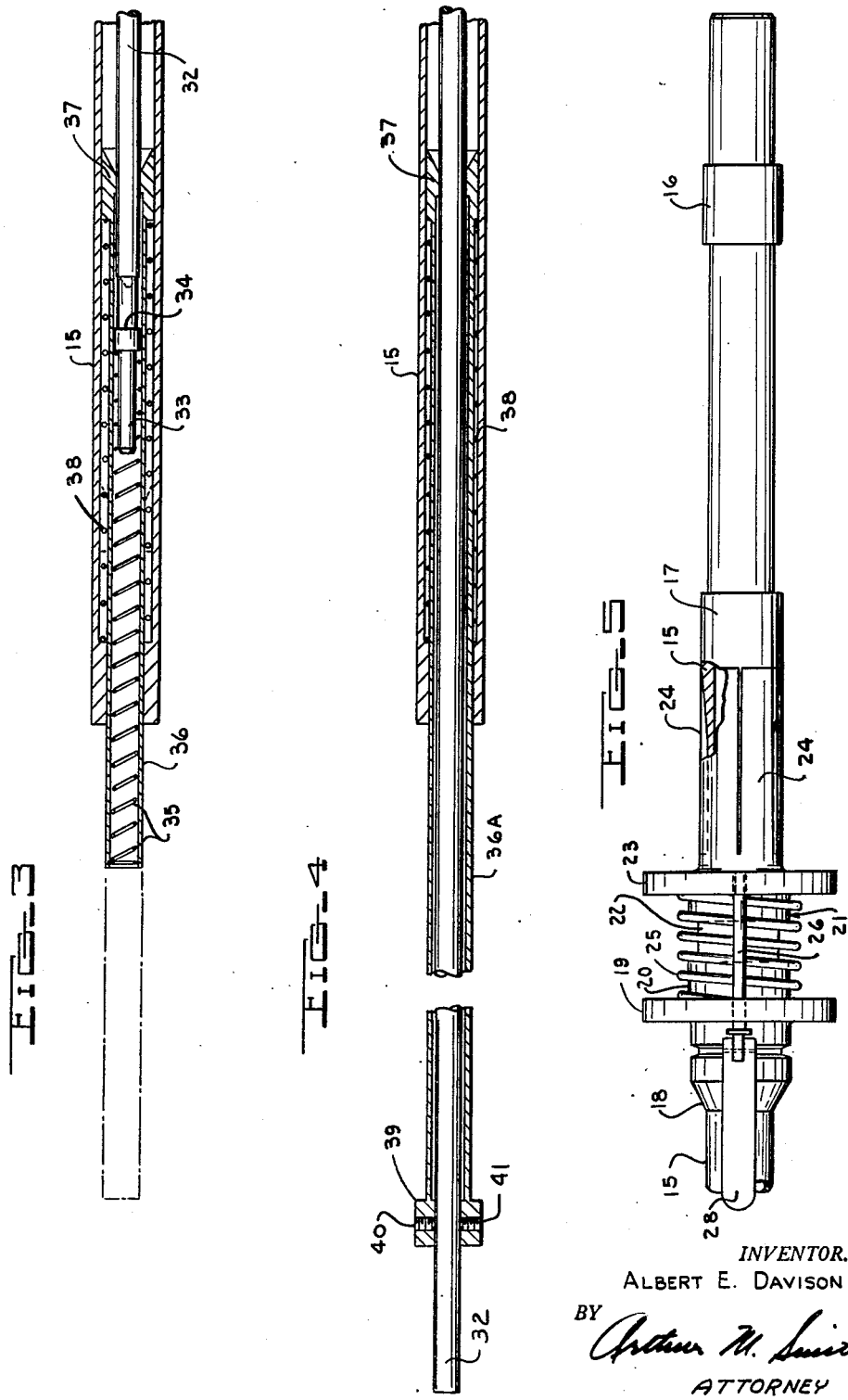

2,614,315

UNITED STATES PATENT OFFICE 2,614,315

AUTOMATIC FEEDING DEVICE

Albert E. Davison, Dearborn, Mich.

Application September 20, 1948, Serial No. 50,145

11 Claims. (Cl. 29—59)

The present invention relates to improvements in an automatic feeding device for automatically feeding bar or rod stock in a lathe, and in particular to such a feeding device which may be detachably fitted within the collet tube and extends rearward therefrom behind the lathe head.

Most automatic bar or rod stock feeding devices in use at the present time are complicated and bulky. Ratchet feeding bars, special collet locking and unlocking devices with accompanying cams, sleeves and other such parts make it a time-consuming and difficult operation to attach such devices to a lathe.

Therefore, it is a principal object of the present invention to provide automatic stock feed attachment for a lathe or other similar machine tool which may be quickly and easily installed on or removed therefrom, without requiring reconstruction of the tool.

It is a further object of the present invention to provide an automatic bar feed attachment for lathes and similar types of machine tools, the attachment being efficient in operation and simple in construction.

It is a further object of the present invention to provide an automatic stock feed device for lathes and similar types of machine tools which may be economically manufactured and which, when installed on such a tool effects a positive feeding of the stock with a minimum of attention from the tool operator.

Other objects of this invention will appear in the following description and appended claims, reference being had to the accompanying drawings forming a part of this specification wherein like reference characters designate corresponding parts in the several views.

In the drawings:

Fig. 1 is a partial side elevation in staggered section substantially on the line 1—1 in the direction of the arrows, Fig. 2, and showing the head portion of the automatic bar feed device of the present invention fitted to a lathe, with the lathe head and collet-adjusting device shown in phantom, the tail portion of the device being omitted from this view.

Fig. 2 is a sectional view taken along the line 2—2 in the direction of the arrows, Fig. 1.

Fig. 3 is a sectional view of one embodiment of the tail portion of the feed device whose head portion is shown in Fig. 1.

Fig. 4 is a sectional view of a modified form of the tail portion of the feed device whose head portion is shown in Fig. 1.

Fig. 5 is a top plan view of the portions of the feed device shown in Fig. 1, but omitting the lathe parts shown in phantom in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

For the sake of clarity and order, I will describe a stock feed device embodying my invention as applied to a lathe, it being understood, however, that it may be applied also to any machine tool having a rotating stock head to which stock is fed through a hollow feed spindle. The description of a device embodying the present invention is divided in two parts, (1) the mechanism and method of attaching and detachably locking the automatic feed device to the lathe, and (2) the stock feeding mechanism embodied in the said feeding device.

*(1) Mechanism and method of attaching and detachably locking the feeding device to the lathe*

Referring particularly to Figs. 1, 2 and 5, the automatic feed device embodying the present invention is attached to a lathe in the following manner:

The lathe is first prepared to receive the device of the present invention by inserting the collet chuck 10 into the hollow spindle or sleeve 11 provided in the lathe head 12. The conventional hollow collet draw tube 13 is then inserted through the rear of the lathe head 12 and is screwed to the collet chuck 10. A conventional adjusting device is provided at the rear of the collet draw tube 13 and is indicated by the numeral 14. The collet chuck 10 is the split adjustable jaw type which closes as the taper of the chuck 10 is pulled against the taper of the spindle or sleeve 11.

The outer feed tube 15 of the present invention is then inserted into the free end of the collet draw tube 13. The outer feed tube is formed with the front guide 16, the rear guide 17, the collar 18, the tension ring 19, and the tubular flange 20.

The outer feed tube 15 is held in the draw tube by means of the tubular locking device 21. The tubular locking device 21 is provided at one end with the tubular flange 22, and near its middle with a ring 23. The other end of the said tubular locking device 21 is slotted longitudinally to form the fingers 24. A spring 25 is interposed between the ring 23 of the locking device and the tension ring 19 formed in the outer tube 15. The flange 22 interacts with the flange 20 upon compression or expansion of the spring 25. Shafts 26 and 27 extend through holes in the tension ring 19 and screw into the ring 23. The ends of the shafts 26 and 27 nearest the ring 19 are pivotally attached to arms 28 and 29. The arms 28 and 29 are provided with lugs 30 and 31 which ride in slots provided in the said collar 18 formed on the outer feed tube 15.

The guides 16 and 17 preferably are manufactured slightly oversize so that they may be machined by the user to produce the desired fit with the collet draw tube 13. They may be formed as integral parts of the outer tube 15 as shown in the drawings, or as separate members which are sweated on or otherwise secured to the outer tube 15.

The arms 28 and 29 are in the horizontal position as shown in Fig. 1 when the device of the present invention is attached to a lathe. The device is inserted into the hollow collet draw tube 13 as previously stated, and the arms 24 of the locking member 21 wedge tightly in place between the draw tube 13 and the outer feed tube 15 since the rear guide 17 of the outer feed tube 15 is tapered as shown in Fig. 1 to form a wedge fit with the fingers 24 of the said locking member 21.

The stock, represented by the numeral 32, is inserted into the outer feed tube 15 and is locked in position by adjusting the member 14. Turning the member 14 screws the draw tube 13 onto the rear of the split collet chuck 10, thus pulling the tapered jaws of the said chuck against the taper of the sleeve or spindle 11. This action forces the split jaws down against the stock 32 to provide a solid grip on the said stock 32.

It will be seen that the entire device turns with the stock in the collet so that the stock is not marred. Another important factor resulting from this rotation of the entire device is the tendency of the arms 28 and 29 to move radially outward due to centrifugal force as the device is rotated. As the arms 28 and 29 tend to move radially outward, the lugs 30 and 31 move away from the lathe in the slots provided in the collar 18, and thus pull the outer feed tube 15 away from the lathe. This action wedges the fingers 24 of the locking device 21 tighter between the collet draw tube 13 and the outer feed tube 15 and provides a locking effect.

The arms 28 and 29 and the depending lugs 30 and 31 are relatively broad as shown in Fig. 5. This permits forming a curved relief in the ends of the lugs 30 and 31 to provide spaced points of bearing on the circumference of the groove in the collar 18. By this construction tilting of the arms 28 and 29 and consequent wedging or binding at the pivot points is eliminated.

To unlock the device 21, the arms 28 and 29 are squeezed together, thus pulling the locking member 21 away from the lathe head 12 and disengaging the fingers 24 of the locking member 21 from their wedge fit between the collet draw tube 13 and the outer feed tube 15. The outer feed tube 15 may then be pulled out of the collet draw tube 13 after the jaws of the chuck 10 are released by turning the adjusting member 14.

Although a collet draw tube is depicted in the drawings and has been described in connection with my invention, it is to be understood that the invention will work equally as well with the push type collet tube. The push type collet tube pushes the tapered jaws of a collet chuck against the taper of a sleeve, whereas the draw tube draws or pulls the said jaws against said sleeve taper.

(2) *The stock feeding mechanism*

Referring now to Fig. 3, the bar stock 32 is shown abutting the plunger 33 which is formed with the shoulder 34. The shoulder 34 contacts one end of an inner feed spring 35. The other end of the inner feed spring 35 is seated against the end of the inner feed tube 36. The forward end of the inner feed tube 36 is formed with the flange 37 which contacts the end of the outer feed spring 38. The other end of the outer feed spring 38 is seated against a stop at the rear end of the outer feed tube 15.

In operation, the bar stock 32 is inserted against the plunger 33. The plunger 33 compresses and loads the inner feed spring 35 and thus the stock may be fed under spring tension against a stop (not shown) on the lathe.

If the stock is of sufficient length, the inner feed spring 35 will be loaded, and then the outer feed spring 38 will be compressed as the inner tube 36 moves backward. The stock will then be fed first by the outer feed spring 38 and then by the inner feed spring 35.

Also, if the bar stock is too large in diameter to fit within the inner feed tube 36 and contact the plunger 33, it will contact the flange 37 on the said inner feed tube 36 and thus load only the outer spring 38.

The springs 35 and 38 may be selected so that both springs are loaded by bar stock of ordinary length which will fit within the inner tube 36, and thus introduce greater tension against the said stock in feeding it against a prelocated stop.

An alternate method of accommodating long stock is shown in Fig. 4. As shown in this view, the inner feed spring 35 and plunger 33 have been eliminated, and the inner feed tube 36A extended. A fastening member 39 formed in the end of the inner feed tube 36A holds the stock 32 securely in place in the said inner feed tube 36A by means of any suitable centering and locking device, such for example as the set screws 40 and 41, and the stock 32 is fed by means of the tension in the outer feed spring 38. As the tension in the spring 38 is exhausted, the fastening member 39 is reset and the spring 38 is reloaded. Thus, if the spring 38 will accommodate 36 inch lengths and the bar stock 32 is provided in 72 inch lengths, the 72 inch bar stock may be used by adjusting the fastening member 39 three times. Any conventional means may be utilized to support long pieces of unworked bar or rod stock extending from the rear of the inner feed tube 36.

Having thus described the method of attachment and the feed mechanism, the procedure for using the device of the present invention on a lathe is as follows:

The bar or rod stock 32 is inserted in the outer feed tube 15 against spring tension and extends through the open jaws of the collet chuck 10. One end of the stock 32 extends against a prelocated stop (not shown) attached to the lathe to the right of the lathe head 12, Fig. 1. This stop assures the feeding of rod increments of uniform length. The jaws of the collet chuck 10 are closed on the stock 32 by turning the adjusting member 14. The lathe is actuated and the stock is rotated and worked. Upon working and cutting off the first piece of stock, the member 14 is turned in the opposite direction and the jaws of the collet chuck 10 are opened. The spring tension in the feeding device of the present invention then feeds the next increment of stock against the stop (not shown) and the jaws of the chuck 10 are closed as before, and the operation is repeated.

A particular advantage of the above described method for feeding bar or rod stock is that the stock is yieldably held under spring tension and, therefore, is free to elongate and find its own center during high speed rotation, hence, does not whip or run out while it is being rotated. The device may be used with any desired diameter of feed stock up to the maximum size which can be fed through the collet tube. The device is particularly helpful in feeding stock of the smaller diameters for it provides a positive support therefor throughout the length of the stock. As will be seen, the rear end of the stock centers itself in the feed device so that the feed is on a line which is coaxial with the central longitudinal axis of the collet tube, thus centering the stock at all times.

Having thus described my invention, I claim:

1. A stock feeding device for attachment to a rotating hollow stock feeding spindle and comprising an elongated tube adapted to telescope inside said spindle, a quick release lock mounted on said tube and adapted to hold said tube in said spindle, a stock tube telescoped within said elongated tube and a spring disposed between said stock tube and said elongated tube.

2. A stock feeding device as claimed in claim 1 and further characterized in that a spring biasing mechanism is also mounted in said stock tube and bears against the end of the stock to be fed.

3. A stock feeding device as claimed in claim 2 and further characterized in that said spring biasing mechanism includes a stock end centering member.

4. A stock feeding device as claimed in claim 1 and further characterized in that said quick release lock includes spring means for biasing the lock to a closed position, and centrifugal means for applying additional pressure to maintain the lock in a closed position when said elongated tube is rotated.

5. A stock feeding device for a lathe having a hollow spindle; comprising a feed tube adapted to be telescopically received within the hollow spindle, locking means carried by said feed tube to secure the same within the hollow spindle, a second feed tube telescopically fitted within said first-mentioned feed tube, stop means carried by the rear end of said first-mentioned feed tube, flange means carried by the front part of said second feed tube, spring means interposed between said stop and said flange means, a stock engaging plunger fitted within said second feed tube, a shoulder formed on said plunger and a spring interposed between said shoulder and the rear end of said second feed tube.

6. A stock feeding device for a lathe having a hollow spindle; comprising a collet draw tube having a collet secured to its forward end and adapted to be telescopically received within the hollow spindle, a feed tube telescopically received within the collet draw tube, flange means formed on the outer periphery of said feed tube rearwardly of said collet draw tube, a tubular locking member slidably mounted on said feed tube forward of said flange means, spring means disposed between said flange means and said tubular locking means for biasing them apart, wedging means extending forward from said tubuluar locking member for wedging said collet draw tube and said feed tube together when said flange means and said tubular locking member are biased apart, and release means for moving said tubular locking member toward said flange means for releasing said collet draw tube from said feed tube.

7. A stock feeding device for a lathe having a hollow spindle; comprising a feed tube adapted to be telescopically received within the hollow spindle, a stop means carried by the rear end of said feed tube, a second feed tube telescopically fitted within said first feed tube, flange means carried by the front part of said second feed tube, spring means interposed between said stop means and said flange means, and a locking member formed at the rear of said second feed tube adapted to secure the stock in position.

8. A device for feeding bar or rod stock through the hollow spindle of a lathe, and comprising a collet tube having a collet at its forward end for gripping said bar or rod stock and said collet tube being adapted to be received in said hollow spindle, an outer feed tube with its forward portion extending into said collet tube, spaced annular guides surrounding the forward portion of said outer feed tube and in engagement with the walls of said collet tube, an inner feed tube disposed in telescoping relation with the rear of said outer feed tube, said inner feed tube having means therein adapted to engage said bar or rod stock, spring means located in said outer feed tube to exert a yieldable feeding pressure on said inner feed tube, and locking means for selectively wedging together or releasing said collet tube and said outer feed tube.

9. A device as claimed in claim 8 and further characterized in that said locking means includes tapered fingers extending forwardly between said collet tube and said outer feed tube, and the rearmost guide on the outer feed tube is tapered rearwardly to form a wedge slot adapted to receive said fingers for wedging together said collet tube and said outer feed tube.

10. A device as claimed in claim 9 and further characterized in that said locking means includes an annular ring formed on said feed tube, a second annular ring slidable thereon which supports said tapered fingers, and a spring interposed between said annular rings for biasing them apart; and additional means for moving said second annular ring against said spring to pull said fingers out of wedging relation with said collet tube and feed tube.

11. A device as claimed in claim 10 and further characterized in that said additional means comprises shafts extending longitudinally through the annular ring of said outer feed tube and secured to the annular ring in said slidable second annular ring, horizontal arms pivotally attached to the rear of said shafts, a collar formed in said outer feed shaft and having slots formed therein, and lugs extending from said arms into the slots of said collar.

ALBERT E. DAVISON.

REFERENCES CITED

The following references are of record in the file of this patent:

UNITED STATES PATENTS

| Number | Name | Date |
| --- | --- | --- |
| 508,864 | Briggs | Nov. 14, 1893 |
| 1,604,580 | Jaques | Oct. 26, 1926 |
| 1,874,975 | Hanhardt | Aug. 30, 1932 |